Figure 1:
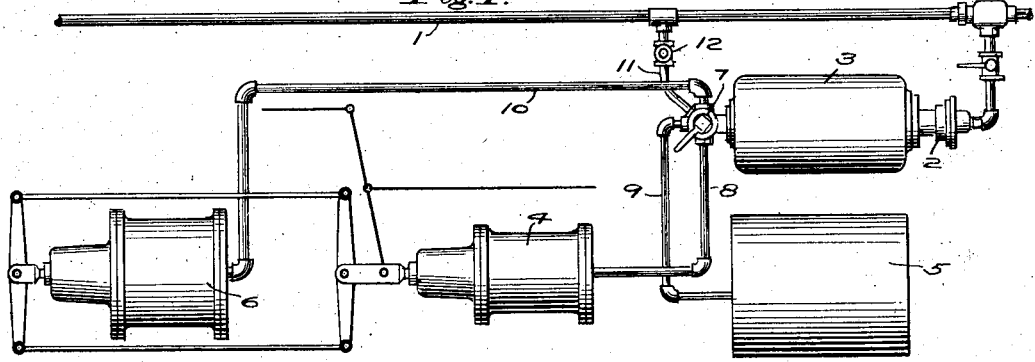

No. 834,263. PATENTED OCT. 30, 1906.
F. L. CLARK & W. V. TURNER.
LOAD BRAKE APPARATUS.
APPLICATION FILED FEB. 27, 1905.

2 SHEETS—SHEET 1.

WITNESSES
J. S. Custer
J. B. MacDonald

INVENTORS
Francis L. Clark
Walter V. Turner
by S. H. Wright Att'y.

No. 834,263. PATENTED OCT. 30, 1906.
F. L. CLARK & W. V. TURNER.
LOAD BRAKE APPARATUS.
APPLICATION FILED FEB. 27, 1905.

2 SHEETS—SHEET 2.

WITNESSES
J. S. Custer
J. B. MacDonald

INVENTORS
Francis L. Clark
Walter V. Turner
by E. Wright Att'y.

THE NORRIS PETERS CO., WASHINGTON, D. C.

UNITED STATES PATENT OFFICE.

FRANCIS L. CLARK, OF PITTSBURG, AND WALTER V. TURNER, OF WILKINSBURG, PENNSYLVANIA, ASSIGNORS TO THE WESTINGHOUSE AIR BRAKE COMPANY, OF PITTSBURG, PENNSYLVANIA, A CORPORATION OF PENNSYLVANIA.

LOAD-BRAKE APPARATUS.

No. 834,263.     Specification of Letters Patent.     Patented Oct. 30, 1906.

Application filed February 27, 1905. Serial No. 247,451.

*To all whom it may concern:*

Be it known that we, FRANCIS L. CLARK, residing in Pittsburg, and WALTER V. TURNER, residing in Wilkinsburg, in the county of Allegheny, State of Pennsylvania, citizens of the United States, have invented a certain new and useful Improvement in Load-Brake Apparatus, of which the following is a specification.

This invention relates to automatic air-brakes, and more particularly to what is known as "light" and "load" brake apparatus adapted to be adjusted to give either heavy braking power on a car when loaded or light braking power on the car when empty.

It is a well-known fact that a much greater braking pressure may be applied to the shoes on a heavily-loaded car than on an empty car without danger of sliding the wheels, and that in view of the great and increasing capacity of modern freight-cars it is necessary to adjust the braking power to correspond to the empty or loaded condition of the car, in order to secure the maximum or even a reasonable degree of braking efficiency. Various devices have heretofore been proposed for this purpose, and some of them have involved the use of an additional reservoir operating with a single triple valve; but as the triple valve is usually designed with a certain capacity of ports and passages corresponding to given relative sizes of auxiliary-reservoir and brake cylinder, an irregular and unsatisfactory action of the triple valve was produced when the additional reservoir was cut in for heavy braking.

According to one feature of our invention we employ an additional reservoir, adapted to be cut in with the usual auxiliary reservoir for heavy braking, and an additional brake-cylinder of larger size, which is used in the place of the smaller brake-cylinder when the combined reservoir capacity is cut in for heavy braking. In this way the relative capacity of reservoir and brake-cylinder may be substantially the same in both cases and a single triple valve may be employed.

In many of the freight-cars as now built, especially on hopper-bottom cars, the available space for brake apparatus and brake-cylinder connections is very limited, and it is often impossible to connect up two brake-cylinders to the brake-rigging according to the usual tandem arrangement. It is therefore very desirable to provide a construction which will occupy very little if any more space than the usual brake-cylinder connection; and with this object in view another feature of this invention comprises an improved form of compound brake-cylinder, having the smaller cylinder located within the larger, so that the whole occupies only about the same space as a single brake-cylinder and can as readily be connected up to the brake-rigging.

Figure 2:
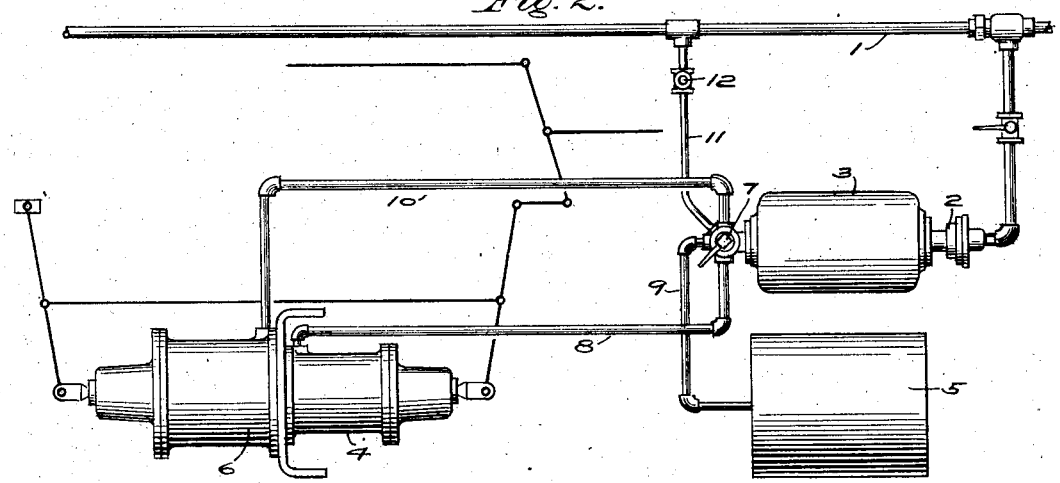
Figure 3:
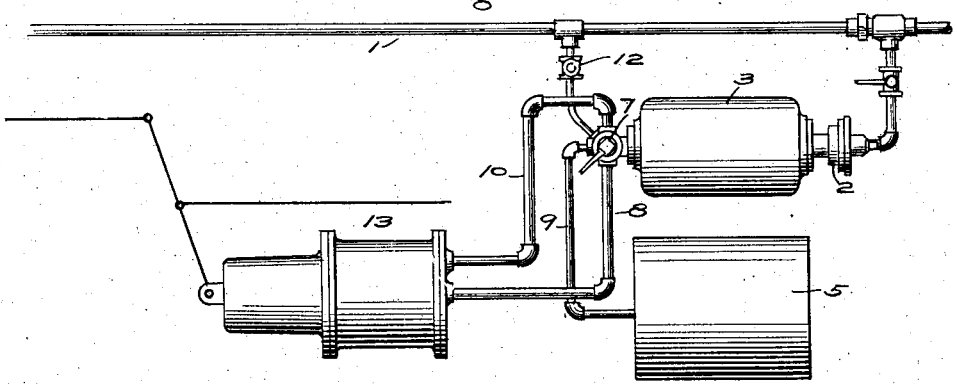
Figure 4:
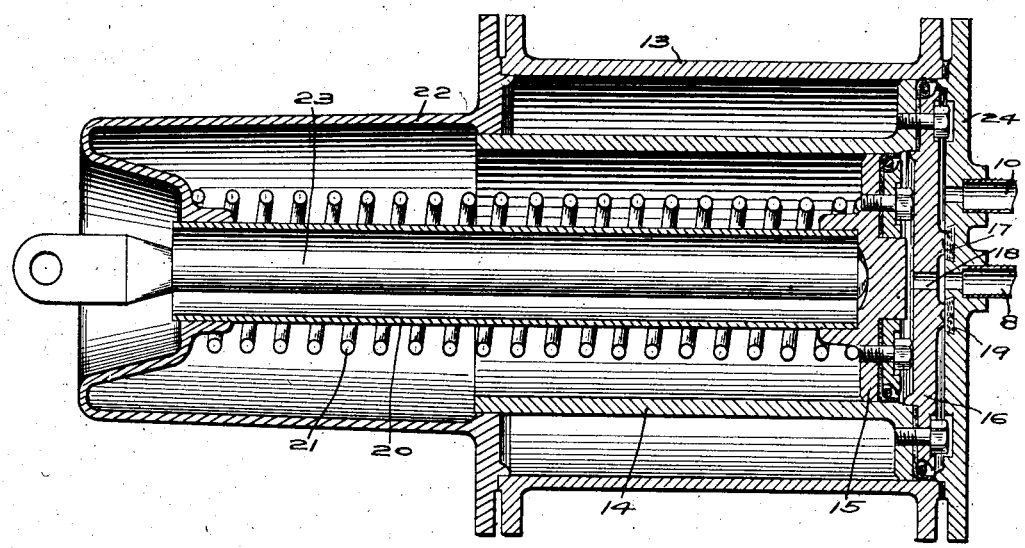
Figure 5:
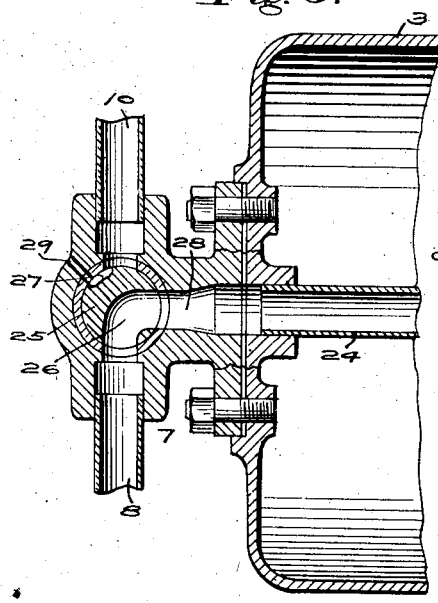
Figure 6:
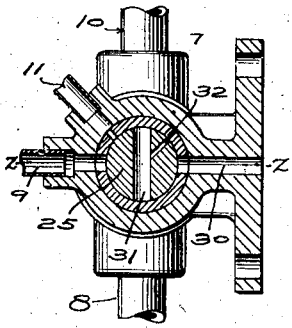

In the accompanying drawings, Figure 1 is a diagrammatic plan view of a car equipment, showing one form of our improvement; Fig. 2, a similar diagram, showing a modified arrangement of the brake-cylinders; Fig. 3, a similar diagram, showing our improved compound brake-cylinder connected up with the apparatus embodying the other features of our invention; Fig. 4, a central sectional view of our improved compound brake-cylinder; Fig. 5, a horizontal section taken on the line $x\ x$ of Fig. 7 through the adjustable cock and pipe connections, with a portion of the auxiliary reservoir; Fig. 6, a horizontal section of the cock, taken on the line $y\ y$ of Fig. 7; and Fig. 7, a vertical section of the cock, taken on the line $z\ z$ of Fig. 6.

According to our improvement we provide in addition to the usual train-pipe 1, triple valve 2, auxiliary reservoir 3, and brake-cylinder 4 a supplemental reservoir 5, a larger additional brake-cylinder 6, and an adjustable cock 7, having ports and passages adapted in one position to establish communication between the two reservoirs and to connect the triple valve with the large brake-cylinder, while in another position the triple valve is connected to the small brake-cylinder and the supplemental reservoir is cut out. The adjustable cock is preferably of the rotary type, having a casing provided with ports communicating with pipes 8, 9, and 10, leading to the small brake-cylinder, the supplemental reservoir and the large brake-cylinder, respectively, port 28 communicating with the pipe 24, leading from the service-port of the triple valve and port 30, communicating with the auxiliary reservoir 3. If desired, a pipe 11 communicating with the train-pipe through a check-valve 12, may be provided for assisting in charging the supplemental reservoir 5. The rotary plug 25 is provided with ports 26, 31, 27, and 32.

Figure 7:
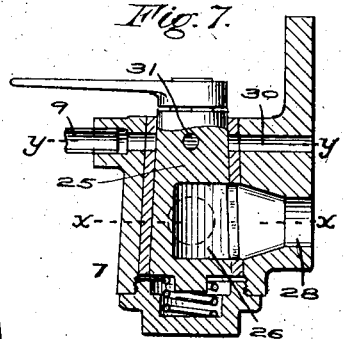

When the cock is in position for light braking, as indicated in Figs. 5, 6, and 7, the port 26 connects the triple valve with the pipe 8, leading to the small brake-cylinder, while the large brake-cylinder is open to the atmosphere through pipe 10, cavity 27, and port 29, and communication is cut off from the supplemental reservoir to the auxiliary reservoir. The brake then operates in the usual manner, the small brake-cylinder giving the desired amount of braking power for the empty car.

When the car is loaded and heavy braking-power is desired, the cock or plug 25 is turned to its other position, in which communication is open from the supplemental reservoir to the auxiliary reservoir through pipe 9 and ports 31 and 30, and the port 26 connects the triple valve with the pipe 10 and the larger brake-cylinder, while the small brake-cylinder is cut out. In this position the port 32 may be employed for connecting the pipe 11 with the combined reservoir-space in order to assist in charging the reservoirs, the port 32 being of small capacity. The auxiliary reservoir is in this manner increased in capacity to the extent of the volume of the supplemental reservoir, and the triple valve then operates upon the usual variations in train-pipe pressure to supply air from this increased reservoir-space to the larger brake-cylinder, thereby giving a greatly-increased braking-pressure for heavy-load braking. The relative capacities of the combined reservoirs to the larger brake-cylinder may be substantially the same as the single auxiliary reservoir to the small brake-cylinder, and as the triple valve may be designed to operate properly with this particular ratio of volumes there will be no irregularity of action on the different cars, whether their condition is loaded or empty.

The usual tandem arrangement for connecting two brake-cylinders to the brake-rigging is shown in Fig. 1, while according to Fig. 2 the brake-cylinders are reversely located with their pressure-heads adjacent to each other. With these arrangements, however, considerable space is necessary to connect up the two brake-cylinders to the rigging, and we therefore prefer to use the improved form of compound brake-cylinder shown in Figs. 3 and 4, in which the smaller cylinder 14 is contained within the larger cylinder 13, the cover-plate 16 of the small cylinder forming the piston for the larger brake-cylinder and having a port-opening 18 for admitting air under pressure to the piston 15 of the small inner cylinder. The hollow piston-rod 20 for the small piston extends out through the opening in the non-pressure head, the extension 22 of which is made of a diameter large enough to inclose the small cylinder 14 when the same is pushed out. Within the hollow rod 20 is located the push-bar 23 for connecting with the cylinder-lever of the brake-rigging, and the spring 21 is placed between the non-pressure head and the small piston-head 15, thereby serving for both cylinders. An annular seat, composed of a rib 17 and gasket 19, is provided between the cylinder-heads 16 and 24 and around the pipe connection 8 and the port-opening 18, thereby preventing leakage into the large cylinder when the cock is set for light braking and the small cylinder only is being used. The pipe 10 communicates with the large cylinder outside of the annular gasket, which is preferably located in the center.

When the cock is set in position for light braking, the triple valve supplies air through pipe 8 and port 18 to the small inner cylinder 14 and acts to move out piston 14 against the spring 21 and apply the brake, the head 16 remaining in its release position with the rib 17 seated on the gasket by the pressure admitted to the small cylinder, thereby maintaining a tight joint and preventing leakage. In case there should be any leakage past the gasket it would merely escape to the atmosphere through pipe 10 and ports 27 and 29 in the cock 7.

When the cock is set for heavy braking, air is supplied from the triple valve through pipe 10 to the large cylinder, which pressure then moves out the large piston 16, together with the smaller cylinder 14 and its piston 15. As the large piston moves out away from the gasket the air enters the port 18, but does not move the small piston-head 14 away from the large head 16 on account of the greater pressure acting upon the large head. Consequently both move out together, the inner piston serving as a push-bar for the larger piston and compressing the spring 21.

The pipe 8 is closed at the cock 7 when the large brake-cylinder is cut in, so that no air can escape from the cylinder through this connection.

By means of this improved combined brake-cylinder no additional space is required over what is necessary for the ordinary single brake-cylinder equipment, and, furthermore, this improved load-brake apparatus may in this way be readily applied to any and all forms of freight-cars where other arrangements of brake-rigging for connecting up two brake-cylinders would be impracticable.

Having now described our invention, what we claim as new, and desire to secure by Letters Patent, is—

1. In a fluid-pressure brake, the combination with a train-pipe, auxiliary reservoir, triple valve, and brake-cylinder, of a supplemental reservoir, an additional brake-cylinder, and a cock for cutting in or out the said supplemental reservoir and additional brake-cylinder.

2. In a fluid-pressure brake, the combination with a train-pipe, auxiliary reservoir, triple valve, and brake-cylinder, of a larger brake-cylinder, and means for increasing the capacity of the auxiliary reservoir and for cutting in the larger brake-cylinder.

3. In a fluid-pressure brake, the combination with a train-pipe, auxiliary reservoir, triple valve, and brake-cylinder, of a supplemental reservoir, a larger brake-cylinder, and a cock for controlling communication from the supplemental reservoir to the auxiliary reservoir, and from the triple valve to either one of the brake-cylinders.

4. A compound brake-cylinder having one cylinder located within the other, and separate means for admitting fluid under pressure to either cylinder.

5. A compound brake-cylinder comprising a large cylinder and piston, a smaller cylinder and piston carried by the large piston, and separate inlet-ports for said cylinders.

6. A compound brake-cylinder comprising a large cylinder and piston, a small cylinder having a head forming a portion of the large piston, a small piston within the small cylinder, and means for admitting air to either cylinder.

7. A compound brake-cylinder comprising a large cylinder and piston, a small cylinder movable with the large piston, a piston within the small cylinder and a spring for returning both pistons to release position.

8. A compound brake-cylinder comprising a large cylinder and piston, a small cylinder carried by the large piston, separate inlet-ports for said cylinders, a piston for the small cylinder and having a piston-rod which also constitutes a push-bar for the large piston.

9. A compound brake-cylinder comprising a large cylinder and a piston, small cylinder carried by the large piston, a piston and rod for the small cylinder, a spring acting to return said small piston, and separate ports for admitting fluid under pressure to either cylinder.

10. A compound brake-cylinder comprising a large cylinder and piston, a small cylinder having a head forming a portion of the large piston, a small piston within the small cylinder, a port in said large piston for admitting fluid under pressure to the small cylinder, and means for normally maintaining a tight joint between the heads of the small and large cylinders around said port.

11. A compound brake-cylinder comprising a large cylinder and piston, a small cylinder and piston carried by the large piston and having a hollow piston-rod, and a push-bar located in the hollow rod.

12. A compound brake-cylinder comprising a large cylinder and piston, a small cylinder and piston carried by the large piston, the large piston forming a head for the small cylinder and having a port therein for supplying the small cylinder.

13. A compound brake-cylinder comprising a large cylinder and piston, a small cylinder within the large one, and a small piston in the small cylinder and having a movement independent of the large piston to apply the brakes.

In testimony whereof we have hereunto set our hands.

FRANCIS L. CLARK.
WALTER V. TURNER.

Witnesses:
J. S. CUSTER,
R. F. EMERY.